United States Patent [19]

Kashiwagi

[11] Patent Number: 4,780,819
[45] Date of Patent: Oct. 25, 1988

[54] EMULATOR SYSTEM UTILIZING A PROGRAM COUNTER AND A LATCH COUPLED TO AN EMULATOR MEMORY FOR REDUCING FETCH TINE OF INSTRUCTIONS STORED IN THE EMULATOR MEMORY

[75] Inventor: Haruhisa Kashiwagi, Tokyo, Japan

[73] Assignee: NEC Corporation, Tokyo, Japan

[21] Appl. No.: 847,447

[22] Filed: Apr. 3, 1986

[30] Foreign Application Priority Data

Apr. 3, 1985 [JP] Japan ................. 60-70222

[51] Int. Cl.[4] ............................. G06F 11/30
[52] U.S. Cl. ................................. 364/200
[58] Field of Search ... 364/200 MS File, 900 MS File

[56] References Cited

U.S. PATENT DOCUMENTS

| 4,025,902 | 5/1977 | Nakao et al. | 364/104 |
| 4,486,827 | 12/1984 | Shima et al. | 364/200 |
| 4,528,648 | 7/1985 | Lew | 365/236 |
| 4,674,089 | 6/1987 | Poret et al. | 371/25 |

OTHER PUBLICATIONS

The MCS-80/85 Family User'3 s Manual, Jan. 1983, pp. 2-6 to 2-14, pp. A1-20 to A1-23, pp. 6-18.

Primary Examiner—Raulfe B. Zache
Assistant Examiner—Leo L. Wang
Attorney, Agent, or Firm—Foley & Lardner, Schwartz, Jeffery, Schwaab, Mack, Blumenthal & Evans

[57] ABSTRACT

An emulator for a single-chip microcomputer comprises a single-chip microcomputer and an emulation memory which are coupled to each other through a common adress/data bus. A counter is coupled to the address/data bus to receive an address information from the microcomputer and adapted to output an address to the memory. The microcomputer operates to supply an address information on the address/data bus immediately after execution of a branch instruction so that the address information is preset in the counter, and in a program fetch operation the microcomputer generates a program fetch signal to the counter so as to cause the counter to output its content to the memory as an address and also to increment its content.

2 Claims, 2 Drawing Sheets

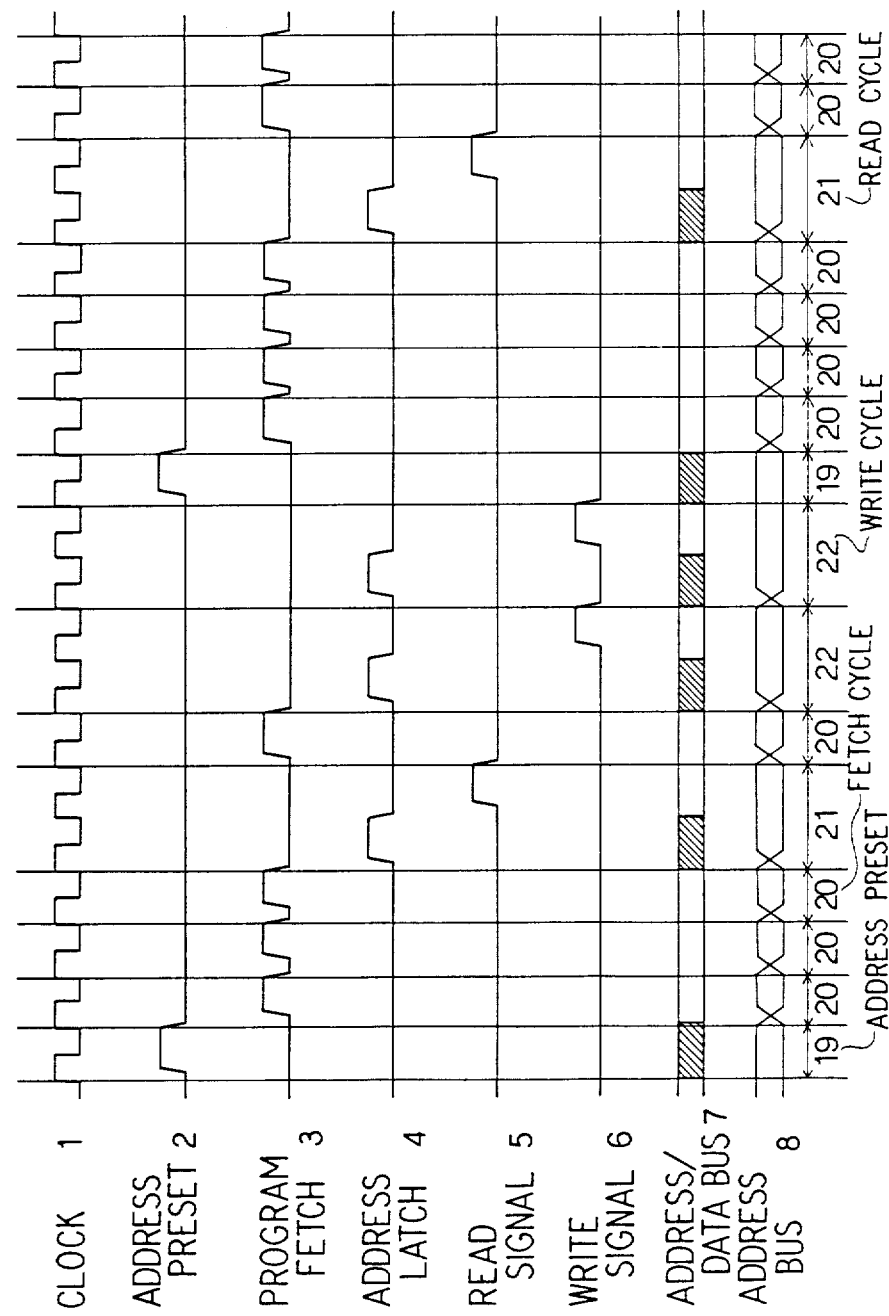

EMULATOR SYSTEM UTILIZING A PROGRAM COUNTER AND A LATCH COUPLED TO AN EMULATOR MEMORY FOR REDUCING FETCH TINE OF INSTRUCTIONS STORED IN THE EMULATOR MEMORY

BACKGROUND OF THE INVENTION

1. Field of the Invention

The present invention relates to an emulator, and more specifically to an emulator for developing a single-chip microcomputer having an internal read only memory.

2. Description of the Related Art

Heretofore, an emulator includes a single-chip microcomputer called an "evaluation chip" and at least one external memory called an "emulation memory" in which a program or data to be evaluated is preliminarily stored. To access the emulation memory, two cycles have been required, i.e., an address latch cycle and a program fetch cycle, because the evaluation chip, namely, an ordinary single-chip microcomputer has common terminals through which an address is applied to the emulation memory and an instruction or data is transferred from the emulation memory in time-division manner.

On the other hand, the internal read only memory of a microcomputer tends to have a program fetch cycle of a higher speed. In compliance with this tendency, the emulation memory is required to operate at a high speed. However, such a memory is expensive.

In order to avoid use of such an expensive memory, it is considered to separate the address terminals and the data terminals of the evaluation chip from each other. In this case, it is sufficient if one fetch operation includes only one cycle, and therefore, even if a low speed emulation memory is used, evaluation can be performed at a high speed. However, the separation of the address terminals and the data terminals results in increase of the number of terminal pins of the evaluation chip, and therefore, this method is not practical.

SUMMARY OF THE INVENTION

Accordingly, it is one object of the present invention to provide an emulator for single-chip microcomputer which includes an evaluation chip and an emulation memory, and can execute the evaluation of a program or data stored in the emulation memory at a high speed.

Another object of the present invention is to provide an emulator suitable for a low speed emulation memory.

The above and other objects of the present invention are achieved in accordance with the present invention by an emulator comprising a microcomputer and an emulation memory which are coupled to each other through a bus, and a counter coupled to the bus to receive an initial address information and a branch address information from the microcomputer and adapted to output an address to the memory. The microcomputer is operative to supply the initial address information designating a program start addresss and to supply the branch address information on the address/data bus after execution of a branch instruction so that the branch address information is preset in the counter, and in a program fetch operation the microcomputer operates to generate a program fetch signal to the counter so as to cause the counter to output its content to the memory as an address and also to increment its content.

Specifically, there is also provided a latch coupled to the bus to receive the initial address information and the branch address information from the microcomputer and adapted to output these addresses to the memory. In this case, the microcomputer is operative to supply the address information on the bus in a first stage of a read/write cycle, so that the address information is latched in the latch, and in a second stage of the read/write cycle the microcomputer operates to cause the latch to output its content to the memory as an address. In one embodiment, the program fetch signal is supplied through a NOT circuit to the latch, so that in the second stage of the read/write cycle, the microcomputer outputs an inactive program fetch signal through the NOT circuit to the latch whereby the latch is enabled to output its content to the memory. Further, the emulation memory is coupled through a buffer to the address/data bus, and the buffer is controlled by the program fetch signal.

In a preferred embodiment, the emulator for a single-chip microcomputer in accordance with the present invention comprises:

an emulation memory coupled to a bus and storing a program to be evaluated, the program having a plurality of instructions;

a single-chip microcomputer for development program having terminals receiving instructions through the bus coupled to the emulation memory and generating at least an address preset signal, an address latch signal and a program fetch signal, a counter coupled to the bus and being operative to be preset with an address on the bus in response to the address preset signal, the counter being in response to each program fetch signal to ouptut its content to the memory as an address and to increment its content; and a latch coupled to the bus and adapted to latch an address on the bus in response to the address latch signal, the latch responding to an inverted program fetch signal to output its content to the memory as an address.

With the above arrangement, immediately after execution of a branch instruction of the microcomputer outputs the branch address information and the branch address preset signal so that the address information is preset in the counter, and in the succeeding program fetch operation, the content of the counter is outputted as an address to the memory in response to each program fetch signal so that an instruction or data is read out of the emulation memory without address from the microcomputer and also the counter is incremented with each program fetch signal.

Further, in a first stage of a read/write cycle, the microcomputer outputs the address information and the program latch signal so that the address information is latched in the latch, and in a second stage of the read/write cycle the microcomputer generates an inactive program fetch signal to cause the latch to output its content to the memory as an address.

More specifically, the microcomputer further generates a memory read signal and a memory write signal, and the emulation memory is coupled through a bidirectional buffer to the bus. This buffer is controlled to transfer the instruction or data by the program fetch signal, the read signal or the write signal, and the data transfer direction of the buffer is controlled by the write signal.

As seem from the above, the emulator in accordance with the present invention ceaselessly uses the address/data bus as the data bus during the program fetch operation excluding the cycle immediately after the execution of the branch instruction. This method of using the address/data bus allows the program fetch operation without hindrance. The reason for this is that: It is possible to access to the emulation memory by an incrementally increasing address, except for the cycle just after the execution of the branch instruction. Therefore, if only the program fetch signal is generated when the access to the emulation memory is required, the memory can be read out at the incrementally increasing address in the counter and the program fetch operation can be performed.

The "branch instruction" means the instruction which commands an address jump operation, e.g., a jump, a branch, a call, a return, or the like, and further means an interruption by which an address is to be jumped.

The above and other object, features and advantages of the present invention will be apparent from the following description of preferred embodiments of the invention with reference to the accompanying drawings.

BRIEF DESCRIPTION OF THE DRAWINGS

FIG. 2 is a timing chart showing the operation of the emulator shown in FIG. 1.

DESCRIPTION OF THE PREFERRED EMBODIMENT

Figure 1:
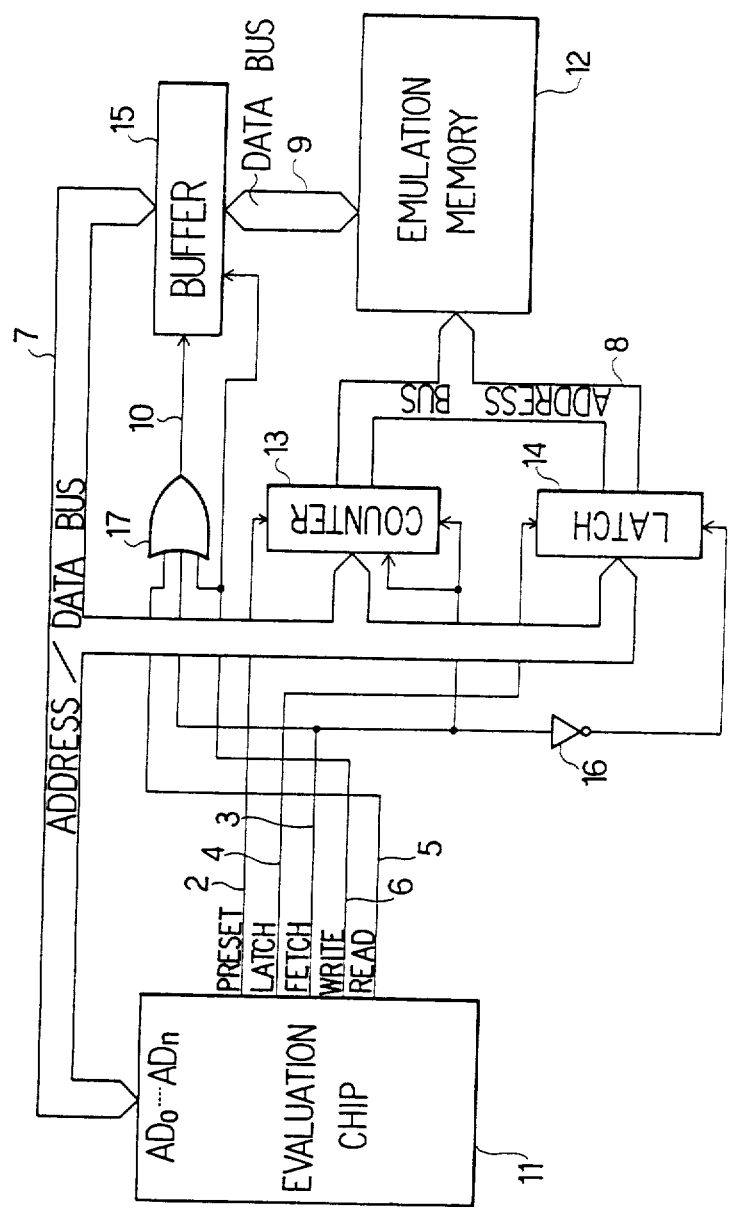
FIG. 1 is a block diagram of one embodiment of the emulator constructed in accordance with the present invention.

Referring to FIG. 1, the shown emulator embodying the present invention comprises a single-chip microcomputer for development purpose, i.e., an evaluation chip 11 having common address/data terminals $AD_0 \ldots AD_n$ coupled through time-division address-/data bus 7 to a counter 13, a latch 14 and a bidirectional buffer 15. The emulator also has an emulation memory 12 coupled to the counter 13 and the latch 14 through an address bus 8, so that the memory location to be read or written is designated by the counter 13 or the latch 14. The data read out from the memory 12 is outputted through a data bus 9 and the buffer 15 to the address-/data bus 7, and the data to be written is inputted from the address/data bus 7 through the buffer 15 and the data bus 9 to the memory 12.

In order to control the above read and write operation, the evaluation chip 11 generates an address preset signal 2, a program fetch siganl, an address latch signal 4, a memory read signal 5 and a memory write signal 6. The address preset signal 2 is fed to a preset control input of the counter 13, and when the signal 2 is active, the address information on the time-division address-/data bus 7 is loaded and preset to the counter 13. On the other hand, the address latch signal 4 is inputted to a latch control input of the latch 14, so that the address information on the bus 7 is set to the latch 14 when the signal 4 is active.

The program fetch signal 3 is rendered active when the evaluation chip 11 fetches the program. In other words, the program fetch signal 3 is a special memory read signal. This program fetch signal 3 is fed to an output control input and a count up input of the counter 13. Therefore, when the signal 3 becomes active, the count value held in the counter 13 is outputted as an address information to the emulation memory 12, and at the trailing edge of the program fetch signal 3 the counter 14 is incremented one count.

Further, the program fetch signal 3 is supplied together with the read signal 5 and the write signal 6 to an OR circuit 17. Therefore, when at least one of these signals 3, 5 and 6 is active, the OR circuit 17 produces a driver enable signal to the bidirectional buffer 15 so that the buffer 15 is rendered active. The data transfer direction of this buffer 15 is controlled by the memory write signal 6. Namely, when the write signal 6 is active, the data is transferred or written from the bus 7 through the buffer 15 to the memory 12. To the contrary, if the write signal 6 is inactive, the data is transferred or read out from the memory 12 through the buffer 15 to the bus 7.

In addition, the program fetch signal 3 is inverted by a NOT circuit 16 and then applied to an output control input of the latch 14, so that when the fetch signal 3 is inactive the address held in the latch 14 is supplied through the address bus 8 to the memory 12. Furthermore, the emulator actually comprises a monitor programmable read only memory, a monitor working memory, input/output devices such as a key board, a display, etc., but these will be omitted from the description and the drawings for simplification.

Next, explanation will be made on the operation of the emulator with reference to FIG. 2 in which reference clocks 1 are shown at an uppermost column.

When the evaluation chip 11 executes a first program or a program immediately after execution of a branch or jump instruction, the address.preset signal 2 is rendered active, so that the address of the first program or the jump destination program on the time-division address-/data bus 7 is loaded to the counter 13. At this time, since the program fetch signal 13 is inactive, the content of the address latch 14 is outputted to the address bus 8 and is used as the address for the emulation memory 12. Namely, as shown in hatching in FIG. 2, the time-division bus 7 operates as the address bus. This cycle is called "program address set cycle 19".

Then, the program fetch signal 3 becomes active, so that the content of the counter 13 preset in the program address set cycle 19 is outputted through the address bus 8 to the emulation memory 12. At the same time, the driver enable signal 10 is rendered active. At this time, since the memory write signal 6 is inactive, the data at the memory location in the memory 12 designated by the counter 13 is read out through the data bus 9 and the bidirectional buffer 15 to the time-division address/data bus 7. This operation is called "program fetch cycle 20".

When the program fetch signal 3 becomes inactive, i.e., at the trailing edge of the signal 3, the counter 13 is incremented one count. Thereafter, unless a branch instruction is executed, the content of the counter 13 is counted up at each program fetch signal 3, and the content of the counter 13 is used as the address for the memory 12. Therefore, it is not necessary to cause the evaluation chip 11 to output the address data at each fetch cycle.

When the evaluation chip 11 interruptively accesses to the memory 12 for reading, the evaluation chip 11 generates the active address latch signal 4 and also outputs on the bus 7 the address designating the memory location at which the data is to be read out. Thus, in a first half of the read cycle, the address is set in the latch 14. At this time, since the program fetch signal 3 is inactive, the output of the latch 14 is enabled by the inverted program fetch siganl applied through the NOT circuit 16, so that the address set in the latch 14 is applied through the address bus 8 to the memory 12. In the second half of the read cycle, the evaluation chip 11 generates the active memory read signal 5 and at the same time, uses the bus 7 as the data bus. At this time, since the memory write signal is inactive, the data is read out from the memory location designated by the address of the latch 14, and fed through the data bus 9, the buffer 15 and the bus 7 to the evaluation chip 11. This is a "memory read cycle 21".

Thereafter, the program fetch operation is consecutively performed (program fetch cycle 20). At that time, since the address of the program has already set in the counter 13, the evaluation chip 11 can successively fetch the programs stored in the memory 12 by only producing the active program fetch signals without supplying the address.

When the evaluation chip 11 writes the date to the memory 12, the evaluation chip 11 generates the active address latch signal 4 and also outputs on the bus 7 the address designating the memory location at which a possbile data is to be written. Thus, the address is set in the latch 14 in a first half of the write cycle. At this time, similarly to the memory read cycle 21, since the program fetch signal 3 is inactive, the output of the latch 14 is enabled by the inverted program fetch signal applied through the NOT circuit 16, so that the address set in the latch 14 is applied through the address bus 8 to the memory 12. In the second half cycle, the evaluation chip 11 generates the active memory write signal 5 and at the same time, outputs on the bus 7 the data to be written, by using the bus 7 as the data bus. Therefore, the data on the bus 7 is supplied through the buffer 15 and the data bus 9 to the memory 12 and is written at the memory location designated by the address of the latch 14. This is a "memory write cycle 22".

As is apparent from FIG. 2, the emulator mentioned above does not require the program fetch cycle 19 which should have been inevitably put just before each program fetch cycle 20 in the evaluation chip adopting the conventional time-division address/data bus system. Therefore, it can be expected to greatly increase the operation speed. If the branch instructions are not frequently generated, the emulation can be performed at a high speed substantially equal to the separated address-/data bus system.

For reference, if an attempt is made to achieve a high speed emulation comparable to the separated address-/data bus system in conventional emulators of the time-division address/data bus system, it is necessary to put two cycles (i.e., the program address set cycle 19 and the program fetch cycle 20) during the time period of one reference clock 1. For the purpose, the emulation memory 12 must be capable of operating at an access time corresponding to one half of the reference clock 1.

Thus, the emulator in accordance with the present invention uses the time-division address/data bus and a low speed emulation memory, but can perform a high speed emulation comparable to the emulator of the separated address/data bus.

The invention has thus been shown and described with reference to specific embodiments. However, it should be noted that the invention is in no way limited to the details of the illustrated structures but changes and modifications may be made within the scope of the appended claims.

I claim:

1. An emulator for a single-chip microcomputer comprising:
   an emulation memory storing a program to be evaluated and coupled to an address bus for receiving an address and to a data bus for at least outputting a readout instruction;
   a counter coupled between an address/data bus and the address bus so as to be preset with an address on the address/data bus and to be incremented so as to sequentially output an address to the emulation memory;
   a latch coupled between the address/data bus and the address bus to latch an address on the address/data bus so as to output the latched address to the emulation memory;
   a buffer coupled to the address/data bus and the data bus for temporarily storing data which is read out from or written into the emulation memory; and
   an evaluation chip coupled to the address/data bus for receiving the program to be evaluated through the buffer from the emulation memory,
   said evaluation chip generating a program fetch signal to the buffer to enable the buffer so as to fetch the instruction to be executed from the emulation memory through the buffer and the address/data bus, the evaluation chip also generating a program preset signal to the counter to cause the counter to be preset with an address on the address/data bus so that the counter is thereafter incremented to supply the address to the emulation memory, whereby the emulation memory is sequentially read out so as to allow a sequential operation, the evaluation chip further generating an address latch signal to the latch to cause the latch to latch an address on the address/data bus so as to supply the latched address to the emulation memory for a branch operation.

2. An emulator as claimed in claim 1 wherein the microcomputer further generates a memory read signal and a memory write signal, and the emulation memory is coupled through a buffer to the bus, the buffer being controlled to transfer an instruction or data in response to the program fetch signal, the read signal or the write signal.

* * * * *